United States Patent
Almeida et al.

(10) Patent No.: US 12,287,792 B2
(45) Date of Patent: Apr. 29, 2025

(54) DENSE RETRIEVAL OF DOCUMENT TEMPLATES

(71) Applicant: Zendesk, Inc., San Francisco, CA (US)

(72) Inventors: Mariana Sá Correia Leite Almeida, Lisbon (PT); Bruno Emanuel Da Graça Martins, Amora (PT); Tiago Manuel Reis Mesquita, Lisbon (PT)

(73) Assignee: Zendesk, Inc., San Francisco, CA (US)

( * ) Notice: Subject to any disclaimer, the term of this patent is extended or adjusted under 35 U.S.C. 154(b) by 155 days.

(21) Appl. No.: 17/938,494

(22) Filed: Oct. 6, 2022

(65) Prior Publication Data

US 2023/0111562 A1 Apr. 13, 2023

Related U.S. Application Data

(60) Provisional application No. 63/253,491, filed on Oct. 7, 2021.

(51) Int. Cl.
*G06F 16/00* (2019.01)
*G06F 16/2455* (2019.01)

(52) U.S. Cl.
CPC .............................. *G06F 16/24556* (2019.01)

(58) Field of Classification Search
None
See application file for complete search history.

(56) References Cited

U.S. PATENT DOCUMENTS

| | | | |
|---|---|---|---|
| 9,529,856 B2 * | 12/2016 | Gupta | G06F 16/90324 |
| 2008/0027925 A1 * | 1/2008 | Li | G06F 16/951 |
| | | | 707/999.005 |
| 2010/0257167 A1 * | 10/2010 | Liu | G06F 16/35 |
| | | | 707/731 |
| 2021/0357542 A1 * | 11/2021 | Bowen | G06Q 30/0621 |
| 2022/0179871 A1 * | 6/2022 | Ahmed | G06N 20/00 |

OTHER PUBLICATIONS

Ruiyang, Ren et al., "PAIR: Leveraging Passage-Centric Similarity Relation for Improving Dense Passage Retrieval", arXiv:2108.06027v1 [cs.IR] Aug. 13, 2021.

(Continued)

*Primary Examiner* — Thu Nguyet T Le
(74) *Attorney, Agent, or Firm* — Dinsmore & Shohl LLP

(57) ABSTRACT

A system and method are provided for supporting dense retrieval of a template (e.g., a document template) for responding to a query or other textual input. The templates and past queries that were responded to using the templates are stored. A machine-learning model for matching a new query to the most appropriate template is trained using a selected subset of the stored queries as training queries. For each of one or more training batches or phases, multiple stored templates are selected (e.g., randomly) then, from among all training queries that the selected templates were used for, the same number of queries are selected (e.g., randomly), such that they represent the distribution of the training queries among the selected templates. A unique loss function is computed that leverages similarities and differences not only between each selected training query and each selected template, but also between different queries and between different templates.

25 Claims, 7 Drawing Sheets

(56) References Cited

OTHER PUBLICATIONS

Karpukhin, Vladimir et al., "Dense Passage Retrieval for Open-Domain Question Answering", arXiv:2004.04906v3 [cs.CL] Sep. 30, 2020.
Xiong, Lee et al., "Approximate Nearest Neighbor Negative Contrastive Learning for Dense Text Retrieval", arXiv:2007.00808v2 [cs.IR] Oct. 20, 2020.
Li, Yizhi et al., "More Robust Dense Retrieval with Contrastive Dual Learning", arXiv:2107.07773v1 [cs.IR] Jul. 16, 2021.

* cited by examiner $$\mathcal{L}(A,B) = -\frac{1}{|A|}\sum_{i\in I, a_i\in A_i}\frac{1}{|B_i|}\sum_{b_i\in B_i}\log\left(\frac{e^{s(a_i,b_i)}}{e^{s(a_i,b_i)} + \sum_{j\neq i, b_j\in B_j}e^{s(a_i,b_j)}}\right)$$

| Dataset | #queries train | #queries val | #queries test | #t | $P_{80\%}$#tokens q | $P_{80\%}$#tokens t | Lang |
|---|---|---|---|---|---|---|---|
| CS-1 | 17858 | 3127 | 3918 | 445 | 113 | 396 | en |
| CS-2 | 1092 | 187 | 650 | 82 | 111 | 164 | pt |

FIG. 7B

| Methods | CS-1 MMR@10 | CS-1 R@3 | CS-1 Epochs | CS-2 MMR@10 | CS-2 R@3 | CS-2 Epochs |
|---|---|---|---|---|---|---|
| Unsupervised | | | | | | |
| BM25 | 85 ± 0.0 | 10.1 ± 0.0 | - | 13.7 ± 0.0 | 16.6 ± 0.0 | - |
| SBERT 0-shot | 10.2 ± 0.0 | 12.0 ± 0.0 | - | 16.2 ± 0.0 | 20.2 ± 0.0 | - |
| DPR (random unrelated) | 39.4 ± 0.2 | 45.0 ± 0.4 | 25.0 ± 1.9 | 63.5 ± 1.9 | 73.6 ± 1.6 | 15.2 ± 2.2 |
| Ours | | | | | | |
| DPR + sampling | 41 ± 0.9 | 46.9 ± 0.9 | 4.5 ± 1.1 | 65.2 ± 1.6 | 75.4 ± 1.2 | 5.8 ± 0.8 |
| DPR + sampling + loss | 42.2 ± 0.3 | 48.2 ± 0.3 | 3.8 ± 0.8 | 65.4 ± 0.8 | 75.7 ± 1.0 | 8.0 ± 1.6 |

DENSE RETRIEVAL OF DOCUMENT TEMPLATES

RELATED APPLICATION(S)

This application claims the benefit of U.S. Provisional Application No. 63/253,491, which was filed Oct. 7, 2021 and is incorporated herein by reference.

BACKGROUND

This disclosure relates to the field of computer science. More particularly, a system and methods are provided for improved training of computer-based models for retrieving desired information from a large set of data.

In some computing environments, vast amounts of textual data are stored for retrieval and further processing (for display, for serving, for use in a workflow). In particular, based on a data request (e.g., a query), a vast store of responsive information may need to be searched. However, existing methods of identifying or selecting the 'best' match for responding to the query often provide substandard results. More specifically, machine-learning models are usually employed to do the matching, for example to find a document or set of documents that are related or responsive to a query or request, among a dense collection of candidate documents. However, the models can perform only as well as they are trained, and existing training methods are not well-suited for all types of environments.

As a specific example, help centers and customer support centers that receive queries regarding products and services, and requests for assistance, often maintain templates that human or automated agents can use for generating appropriate responses. However, it is not always easy for an agent to identify the most pertinent or helpful template for a given query, especially as the number of templates grows. Selecting a sub-optimal template and providing a sub-optimal response for a query can diminish customer satisfaction, decrease efficiency, and increase costs, especially when the sub-optimal response results in another query, perhaps to clarify the response.

Therefore, what is needed is a framework for efficient and effective training of a machine-learning model to match a new query with the response template that will yield the most appropriate and helpful response.

SUMMARY

In some embodiments, systems and methods are provided for improved training of machine-learning models. The models are used to select, from a dense repository of textual information (e.g., document templates or macros), a result or set of results that are most relevant or responsive to a given input set of text (e.g., a query, a document request, a customer-support request).

In some implementations, for example, an automated or human customer-support agent receives a question or request for assistance (e.g., a query, a 'ticket') from a customer or a user. The query is input to a machine-learning model that analyzes the query text, searches a repository for answers, documents, templates, and/or other possible responses, and provides the most relevant or best match to the agent. The agent can then adapt or customize the matching document if/as necessary to provide the most effective response to the query.

In order to improve the model's performance, methods described herein provide for more effective training by selecting training batches that not only train the model better, but also faster. For example, when training the model on a set of historical queries that are best responded to with particular templates, more queries are selected for templates that are used most often, and fewer queries are selected for templates used less often. The methods also ensure the model explores all templates uniformly (or nearly uniformly) during training. Therefore, the query/template sampling may be described as semi-independent instead of completely random.

In addition, within a training batch, negative labeling may be applied intelligently to inform the model of templates that are not responsive or not suitable for serving in response to a particular query or set of query text. Thus, for a given set of queries such that there is one matching or 'best' document template (e.g., a template for the document that should be returned in response to that query), all templates other than that one may be labeled as negatives in the training batch in relation to that particular query. As a result, each document in the batch may be labeled negative for all queries in the set that the document does not match. In contrast, conventional methods rely on positional information within a training batch for negative labeling, thereby imposing limitations on batch formation.

Further, an improved loss function is provided for training a model beyond just correlating queries and document templates (e.g., to match queries with the correct document(s)). Instead, queries are also correlated with each other and templates are correlated with each other. In these embodiments, correlating queries with each other reinforces dissimilarity between queries that match different document templates and promotes similarity between queries that match the same template. Similarly, correlating document templates with each other reinforces dissimilarity between different templates.

Because of the robust correlations the model applies during each batch or phase of training, it learns faster which templates are best for which queries and, once trained, is more effective at matching a new query (i.e., a query with text different from queries on which it was trained) with the most appropriate document template.

DESCRIPTION OF THE FIGURES

FIG. 6 depicts an illustrative negative loss function according to some embodiments.

FIG. 7A describes two datasets used to test the effectiveness and training efficiency of an embodiment described herein.

FIG. 7B reflects the performance of an embodiment trained on the datasets of FIG. 7A.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system and method are provided for training a machine-learning model to perform dense retrieval of documents (or document templates), in an environment marked by large quantities of queries (that generally contain large amounts of text) and a relatively small number of documents (or document templates) that are responsive to the queries. The training is more efficient than traditional methods, meaning that the model becomes effective faster, with less training and lower consumption of computing resources. In these embodiments, training is accelerated and improved through implementation of a more representative and effective sampling strategy and through use of a novel loss function that leverages similarities and differences between the queries and the templates.

Figure 1:
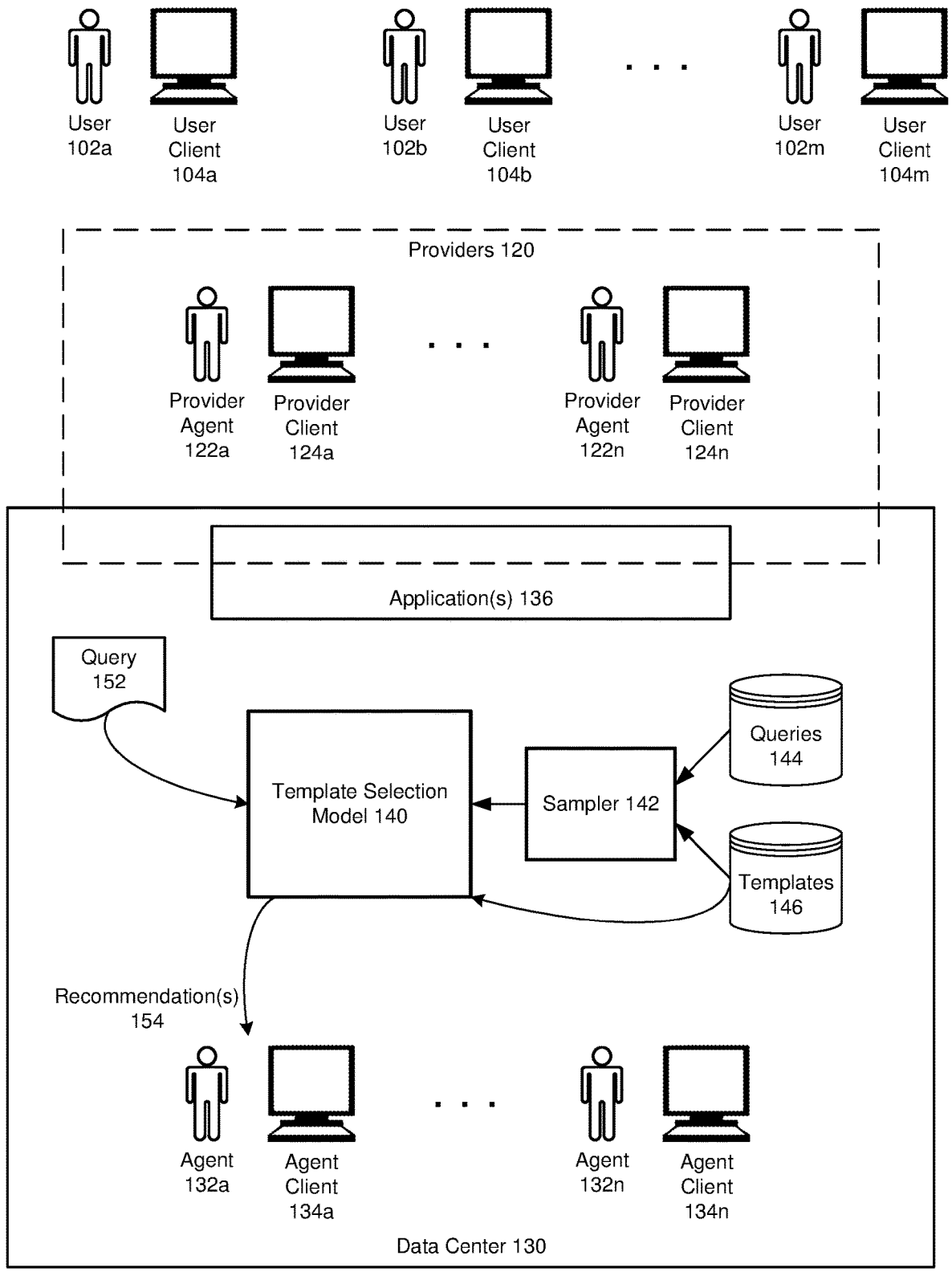
FIG. 1 is a block diagram depicting a computing environment that facilitates efficient dense retrieval of a document or document template, according to some embodiments.

FIG. 1 is a block diagram depicting a computing environment that facilitates efficient dense retrieval of a document or document template, according to some embodiments.

In the environment of FIG. 1, an organization operates one or more data centers 130 that host applications and/or services for use by internal and/or external entities. In particular, data center 130 hosts one or more applications 136 on a collection of computer systems, and provides assistance for those applications via human customer support agents 132a-132n, which operate agent clients 134a-134n, and/or automated agents (e.g., bots). In some implementations, however, data center 130 and applications 136 may be provided by different entities. Thus, although applications 136 are depicted as residing within data center 130 in FIG. 1, in some embodiments the applications may be distinct from the data center.

Each application 136 is used (e.g., subscribed to) by any number of providers 120 (e.g., businesses, governmental entities, and/or other organizations) to interact with end users 102a-102m, which access the applications via user clients 104a-104m. Providers 120 may offer limited assistance to users 102 via provider agents 122a-122n and provider clients 124a-124n.

End user clients 104 are coupled to providers 120, which in turn are coupled to data center 130. End user clients 104 access the physical and/or virtual computers that host applications 136 via any number and type of communication links. For example, some user clients 104 may execute installed software for accessing any or all applications; this software may be supplied by providers 120 and/or data center 130. Other user clients 104 may execute browser software that communicates with web servers that are associated with (e.g., that host) applications 136. The web servers may be operated by data center 130, the organization that hosts or operates data center 130, and/or individual providers 120. In some embodiments, data center 130 may be or may include a customer support system that comprises agents 132 and agent clients 134 and that responds to requests or queries from users 102 and/or provider agents 122.

In some implementations, a user client 104 may access data center 130 and applications 136 directly (e.g., via one or more networks such as the Internet). In other implementations, a user client 104 may first connect to a provider 120 (e.g., a website associated with a particular provider) and be redirected to data center 130 and/or an application 136. In yet other implementations, one or more applications 136 may execute upon computer systems operated by a provider 120, in which case application data may be reported to or retrieved by data center 130.

End users 102 use applications 136 in the context of particular providers. In other words, each user session with an application is associated with at least one provider 120. The context may be set when an end user is redirected to data center 130 from the corresponding provider's site, when the end user logs in using credentials provided by the provider, or in some other way.

When an end user 102 has a problem with or a question about a product or service offered by a provider 120 or an application 136, the end user can access a customer support agent 132 (e.g., via a provider 120), to obtain assistance. For example, a user 102 of a provider 120 that sells retail goods may need help canceling an order that was erroneously entered. This help may be provided by a live provider agent 122 and/or by an automated agent (e.g., a bot). In addition to or instead of assisting end users and/or providers with applications 136, a provider agent 122 or a customer support agent 132 may offer information and/or services, such as product support, operating instructions, a package-delivery service, etc.

Providers 120 may contact the organization that hosts data center 130 with questions or problems. For example, a provider 120 may have questions regarding how to configure the provider's instance of an application 136 or a session with an application 136. As another example, a provider 120 may have suffered data loss or some other performance problem associated with the provider's instance or session with an application. In such a case, the provider may seek help from the organization that hosts data center 130, via an agent 132 and/or an automated bot of the data center or customer support system.

Thus, users 102 and/or provider agents 122 submit queries or questions to data center 130 regarding applications 136 and/or other issues. For example, query 152 may be received at data center 130 from a user 102 via an application 136 or some other channel of communication. In order to respond to the query appropriately (e.g., with information requested by the user), the query is submitted to template selection model 140. Queries received at a customer support system within data center 130 may be associated with or referred to as 'tickets.'

Model 140 examines the query and selects a document or document template from templates 146 to provide to an agent 132 as a starting point for the agent's response to the query. In some embodiments, model 140 ranks each template 146 based on how responsive it is to the query, based on the content (e.g., text) of the query and the templates. It then outputs some number R of recommendations 154 (e.g., the top R templates) from which the agent may select one. In other embodiments, model 140 outputs a single recommendation 154 that identifies the template that it deems most responsive or appropriate for responding to the query. The process of generating recommendations may involve converting text of the query to a vector representation that is compared with representations of stored templates 146 (e.g., via cosine similarity). The terms "document template," "template," and "document" may be used interchangeably herein unless indicated otherwise.

Past or historical queries are stored in a database or other repository (e.g., queries 144) and, along with templates 146, are periodically used to train or re-train model 140. In some embodiments, and as discussed in more detail below, sampler 142 implements semi-independent query/template sampling to train model 140 in phases or batches. During each training phase, sampler 142 randomly selects a number N of templates 146 (N>1), then randomly selects N queries that were previously responded to with the selected templates. However, instead of selecting one query per template (e.g., by randomly selecting pairs of queries and templates), queries are selected based on how often or frequently each selected template has been used to respond to past queries. Thus, if a first template was used to respond to twice the number of queries as a second template, the N queries may include more queries that map to (or match) the first template than queries that match the second template.

In some embodiments, N template identifiers may be sampled, without repetition, according to a distribution—such as the real distribution of templates. Then, the distribution of queries may be filtered according to this result (e.g., to only select queries that map to the sampled templates). From the resultant distribution, a different set of template identifiers may be sampled, with repetition. Finally, the produced sets may be used to sample the corresponding templates and queries.

For each training batch, a novel loss function described in detail below is computed to train the model based on similarities between each selected template and each selected query, between each template and each other template, and between each query and each other query.

Figure 2:
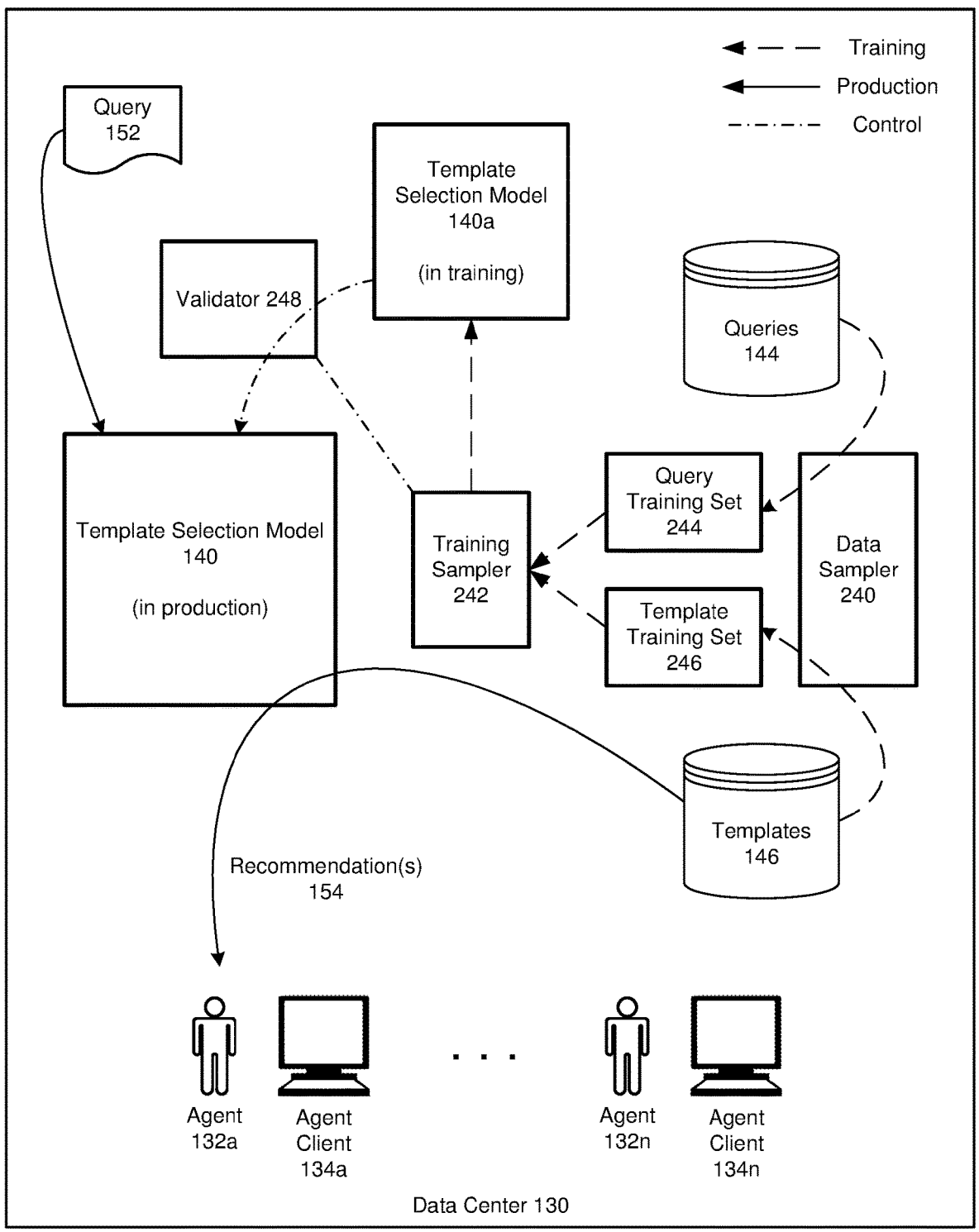
FIG. 2 is a block diagram of a data center configured to train (or retrain) a template selection model, according to some embodiments.

FIG. 2 is a diagram of data center 130 of FIG. 1 configured to train (and/or retrain) a template selection model, according to some embodiments. In these embodiments, sampler 142 is divided into data sampler 240 and training sampler 242. Data sampler 240 generates query training set 244 from queries 144 and template training set 246 from templates 146, while training sampler 242 assembles individual training batches from query training set 244 and template training set 246, and submits them to prospective template selection model 140a for training. Query training set 244 and template training set 246 may include any or all of the queries stored in query repository 144 and template repository 146.

Meanwhile, validator 248 periodically or regularly determines whether prospective model 140a is trained sufficiently well, so as to perform at least as well as production template selection model 140. If not, it may cause training sampler 242 to assemble and execute another training batch. When model 140a is deemed ready (e.g., based on its performance on a validation set of queries), validator 248 or some other entity replaces model 140 with model 140a. Validator 248 may comprise a human operator and/or an automated agent or bot.

Figure 3:
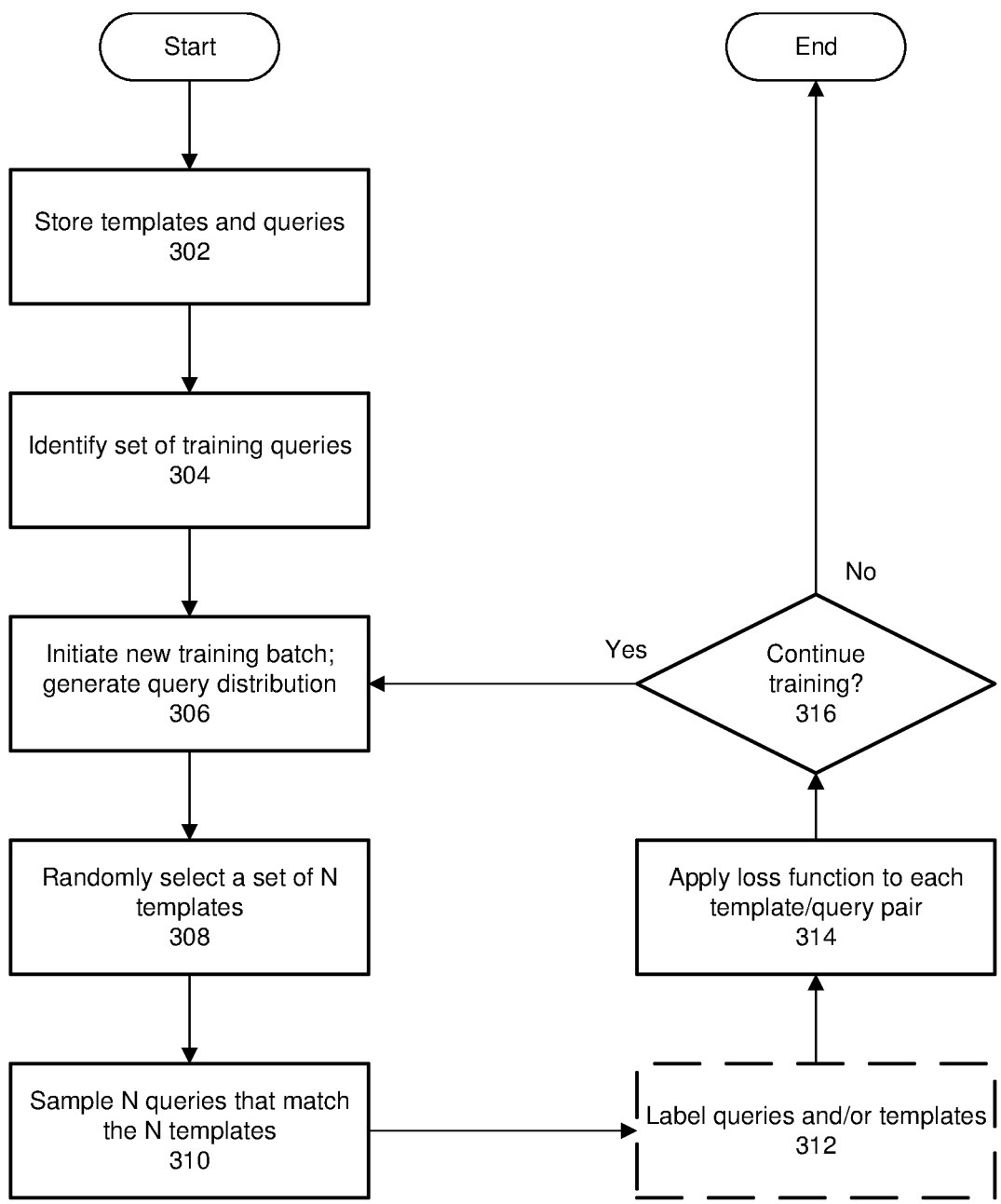
FIG. 3 is a flow chart illustrating a method of training a machine-learning model to perform dense retrieval of a document or document template, according to some embodiments.

FIG. 3 is a flow chart illustrating a method of training a machine-learning model to perform dense retrieval of a document or document template, according to some embodiments. One or more of the illustrated operations may be omitted, repeated, and/or performed in a different order. Accordingly, the specific arrangement of steps shown in FIG. 3 should not be construed in a manner that limits the scope of the embodiments.

In operation 302, queries received at a data center, customer support system or other service, and document templates for preparing responses to the queries, are stored. Stored queries may be retained for some period of time (e.g., weeks, months) before being pruned in favor of more recent queries. Templates may be retained indefinitely, although they may be revised, replaced or otherwise modified over time. In some implementations, a numeral representation (e.g., vector representation) of a query or a template may be stored in association with the query or template.

In operation 304, a portion of the stored queries are selected to be used for training or retraining the model. The selected training set may amount to a particular percentage of all stored queries, may encompass all queries received during a particular time period, or may be chosen in some other way. Similarly, a portion of a repository of templates may be selected for use during training or, alternatively, all templates may be available for training purposes.

In operation 306, the system initiates the process of configuring a new phase of training, which will comprise a batch of N templates and N queries to which a loss function will be applied to train the model regarding similarities and differences between queries and templates. In some embodiments, N equals 32, although in other embodiments N may be greater or lesser than 32. In some other embodiments, N templates and M queries may be sampled, wherein N≠M.

As part of this operation, within the training set of queries, all queries are matched to the templates that are most responsive or most appropriate, if they are not already so matched. In some embodiments, when a query is stored, it is marked or labeled with the template that an agent used to respond to the query. It may be assumed that the template that was used was (and is) the best match for the query. This allows the distribution of the training queries among the templates to be examined, as shown in FIG. 4.

Figure 4:
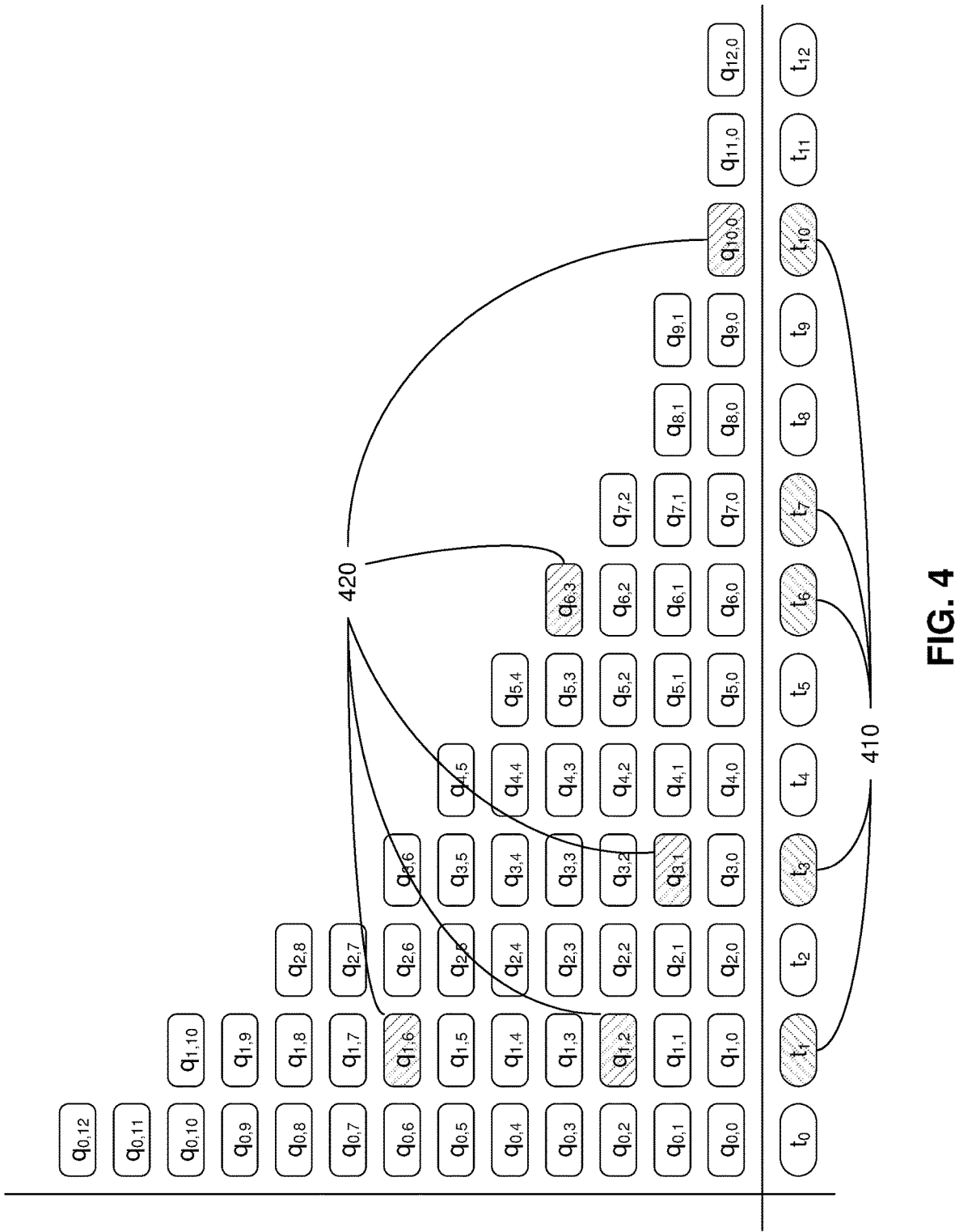
FIG. 4 illustrates a distribution of queries among responsive templates, according to some embodiments.

FIG. 4 depicts a distribution of training queries among responsive templates in an illustrative environment. In this example, some or all of thirteen templates for responding to queries will be used for model training, in one or more batches. For each template $t_0$-$t_{12}$, all matching training queries are aligned and identified in the form $q_{t,n}$, where t is the identifier of the matching template and n is a unique identifier among the training queries that match the template. It should be noted that many more queries and templates may be involved in a typical implementation.

As shown in FIG. 4, some templates are used more often than others. In other words, many queries may be received that are similar in nature (e.g., to change a detail of an order, to reset a login), and one template may be used to respond to all of them, while another template may rarely be needed. In the illustrative environment, each succeeding template, from $t_0$ to $t_{12}$, was used less frequently (or with approximately the same frequency) as the preceding template.

Returning now to the method of FIG. 3, in operation 308, N templates are selected (randomly) from the template store or the templates to be used for training. For example, FIG. 4 reflects the selection of five templates 410.

In operation 310, N queries are sampled among all identified training queries that match the selected templates. Because the identified queries reflect the templates' popularities, the sampled training queries may fairly represent those selected templates that were used most often, as well as those selected templates used least often. FIG. 4 illustrates the selection of five queries 420.

In optional operation 312, the selected queries and/or templates are labeled (if not already labeled) before the loss function is computed on the batch of queries and templates. In particular, each selected query may be (positively) labeled with an identifier of the template that was used to respond to the query. For example, in the query distribution of FIG. 4, queries are inherently labeled with the best template; thus, all queries $q_{i,n}$ match are labeled with matching template $t_i$.

Queries may also be negatively labeled with identifiers of other templates that do not match the query (e.g., some or all other selected templates). Alternatively, by labelling queries with identifiers of their best template matches, as in FIG. 4, it can be assumed that when a query is compared with a different template (e.g., when executing the loss function on the query/template pair), that the different template is a negative match. In other words, when a query $q_{i,n}$ is compared with any template other than template a negative match is assumed. This may be termed "labeled in-batch negatives." Templates may be labeled with their own identifiers or may be unlabeled.

Figure 5:
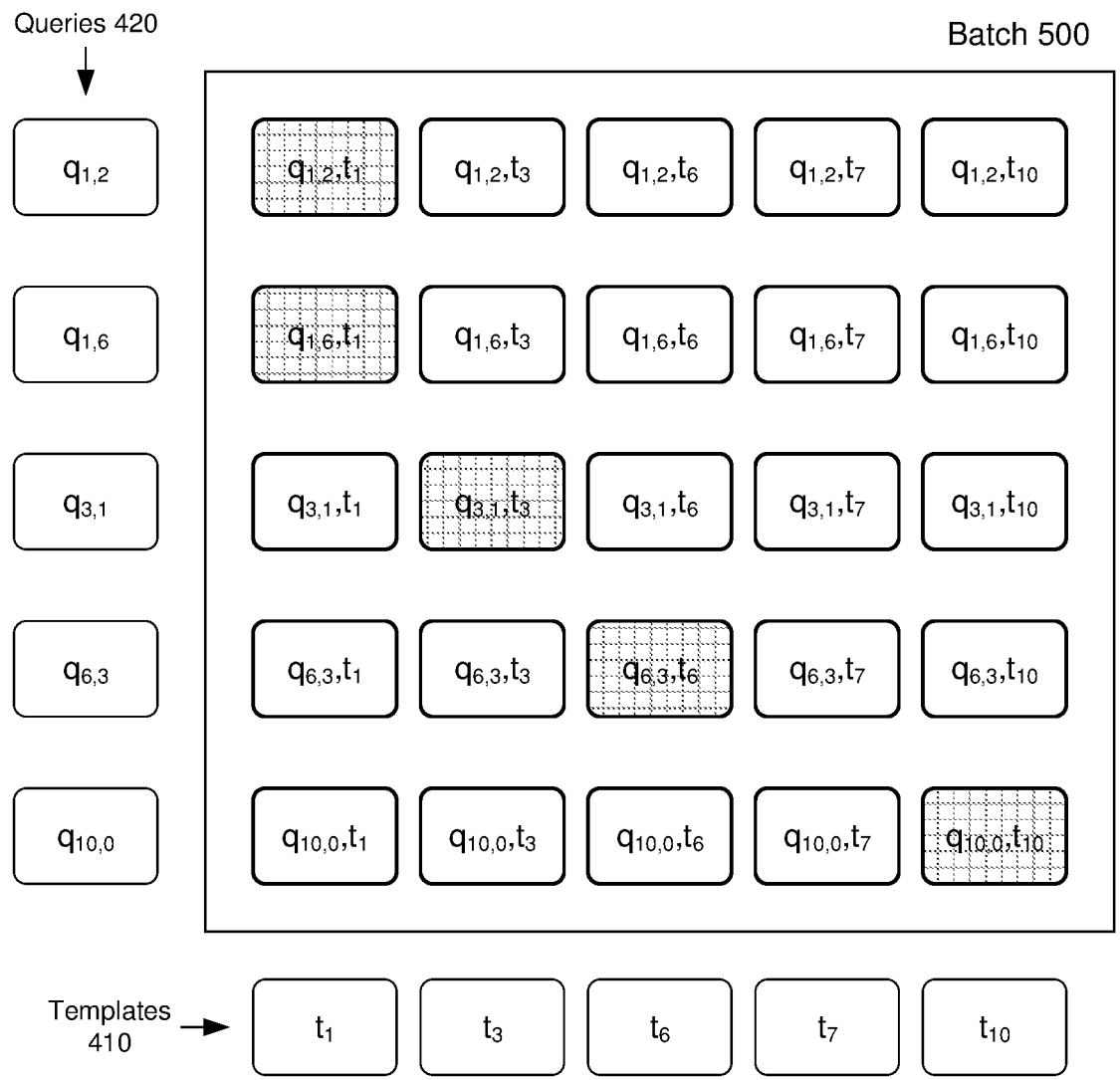
FIG. 5 depicts an illustrative training batch, according to some embodiments.

FIG. 5 illustrates a training batch that may be assembled from selected templates 410 and selected queries 420 of FIG. 4, according to some embodiments. In these embodiments, batch 500 comprises the N selected templates and the N selected queries, which may be envisioned in the form of a matrix. The intersections between each query and each template are labeled appropriately, with identifiers of both the query and the template. Thus, the tuple $<q_{1,2}, t_3>$ identifies the combination or comparison of query $q_{1,2}$ and template $t_3$. The cross-hatched intersections, such as $<q_{1,2}, t_1>$ indicate known positive matches. For example, query $q_{1,2}$ is aligned with template $t_1$, the most suitable template for responding to that query and possibly other queries similar to query $q_{1,2}$. The non-cross-hatched intersections represent negative matches (i.e., queries matched with templates that are not the best or most appropriate match) and may therefore feature a negative label for the indicated template.

Returning again to the method of FIG. 3, in operation 314, the computer system or systems that host the template retrieval model execute a loss function (described below) to determine the similarity between each of the selected queries and templates (i.e., each intersection in batch 500 of FIG. 5). As will be seen, however, the loss function may also compare a query with other queries and compare a template with other templates, which helps train the model on the differences between different templates and the similarities and differences between different queries.

In operation 316, the system determines whether training (or retraining) of the model is complete. This determination may be based on the model's performance on a validation set or test set of templates and queries. In different environments or implementations, different numbers of training batches may be run, and retraining may be conducted with different frequency. If training is to continue, the illustrated method returns to operation 306 to begin configuring a new batch. Otherwise, the method ends.

In some embodiments, to facilitate execution of the loss function, representations (e.g., vectors) of templates may be precomputed and stored for retrieval when the loss function is run. A template's representation may be replaced when the template is revised. In some implementations of these embodiments, a representation of a query may also be precomputed. For example, when a training set of queries is selected, representations may be computed and saved for use during training. Alternatively, representations of some or all training queries may be computed when the loss function is to execute.

As indicated above, after batch 500 of FIG. 5 is formed, an expanded loss function is executed to train the model not only regarding interactions between each query/template (Q/T) pair, but also query/query (Q/Q), template/template (T/T), and template/query (T/Q) pairs. Each collection of text, whether a query or template, may be labeled with the appropriate template (i.e., its own identifier for a template, and the identifier of its most responsive template for a query) and can simply be treated as a set of text for purposes of the loss function.

FIG. 6 depicts an illustrative negative loss function that is used in some embodiments. The two sets of text that are compared during execution of the loss function (with either or both being a query or a template) are labeled A and B. I is the set of all labels in the batch, $A_i$ is the set of texts in A that have label i (i.e., those queries or templates that correspond to template $t_i$), and $B_i$ is the set of texts in B that have label i. $s(a_i, b_i)$ represents the application of a similarity function to the $<a_i, b_i>$ pairing. The function may comprise cosine similarity in some embodiments, but in other embodiments other functions may be employed. e is Euler's number.

Applying the loss function of FIG. 6 to each similarity relation (i.e., Q/T, Q/Q, T/T, T/Q) yields four terms, which can be combined as follows to yield the final loss for the batch: $L_{final} = \alpha L(Q, T) + \beta L(Q, Q) + \gamma L(T, T) + \delta L(T, Q)$. Hyperparameters $\alpha, \beta, \gamma, \delta$ may be identical or different. One or more terms of the final loss function may be eliminated by setting their hyperparameters to zero. The final loss represents how well the model's predicted similarity relations match, overall, the actual similarities between each query and template pairing.

Among the four terms of the final loss function, the L(Q, T) term reflects the average loss of each query $q_i$, using the negative log likelihood of the positive template $t_i$, combined with each possible negative template in the training batch In particular, A=Q (the set of all queries) while B=T (the set of all templates). The L(T, Q) term is the transposition of L(Q, T), wherein A=T and B=Q, and has a similar effect as the first term, but acts on each template instead of each query.

For term L(Q, Q), A=B=Q and the loss function enforces the dissimilarities between query representations that correspond to different templates, while promoting the similarities between queries that correspond to the same template. For term L(T, T), A=B=T and the loss function enforces the dissimilarities between different templates.

In some implementations of the embodiments described above, a template selection model has been trained to be effective through application of less than half the number of training epochs (e.g., batches) required to train a conventional model to the same level of effectiveness. Thus, not only does the training process take approximately half as long, it requires consumption of approximately half the computing resources (e.g., processor time, memory, communication bandwidth) needed to train the conventional model.

FIG. 7A describes a pair of datasets used to train a template selection model according to an embodiment described herein. The two private (but anonymized) real-world query datasets are identified as CS-1 and CS-2. The CS-1 dataset is larger than the CS-2 dataset and comprises queries in the English language, while the CS-2 dataset simulates a challenging real-world environment involving queries in the Portuguese language.

Each query dataset was divided into three partitions, designated "train" (for a training set), "val" (for a validation set) and "test" (for testing the model). In these experiments, the test partitions comprised approximately 16% of the CS-1 dataset and approximately 33% of the CS-2 dataset, and encompassed recent real-world customer interactions (e.g., the newest queries in the datasets). The training partitions comprised approximately 85% of the rest of each dataset and the validation partitions the remainder.

Also, in FIG. 7A, "#t" refers to the number of templates, while the "#tokens" values identify text length in queries (q) and templates (t) in terms of $DistilBERT_{base}$ tokens. Specifically, "P80% tokens" refers to the $80^{th}$ percentile within the distribution of message sizes (e.g., queries and templates) in terms of tokens. Therefore, within dataset CS-1, 80% of queries were shorter than 113 tokens and 80% of templates were shorter than 396 tokens. Similarly, in dataset CS-2, 80% of queries were shorter than 111 tokens and 80% of templates were shorter than 164 tokens.

FIG. 7B illustrates results of training a template selection model using the datasets of FIG. 7A and one or more embodiments described above. For each dataset, multiple existing training methods were executed upon each dataset, in addition to the one or more embodiments disclosed in this document. A first known method that was applied is a BM25 method described in "The probabilistic relevance framework: BM25 and beyond" (by Stephen Robertson and Hugo Zaragoza), available at https://dl.acm.org/doi/10.1561/1500000019. Also, an SBERT (Sentence Bidirectional Encoder Representations from Transformers) method provided in "Making monolingual sentence embedding multilingual using knowledge distillation" (by Nils Reimers and Iryna Gureyvich), available at https://arxiv.org/abs/2004.09813, was run. Finally, a DPR (Dense Passage Retrieval) method described in "Dense Passage Retrieval for Open-Domain Question Answering" (by Vladimir Karpukhin, Barlas Oguz, Sewon Min, Patrick Lewis, Ledell Wu, Sergey Edunov, Danqi Chen, and Wen-tau Yih), available at https://arxiv.org/abs/2004.04906, was executed.

The DPR method employed a vanilla sampling (or "random unrelated") strategy that involves randomly selected queries and, for each such query, randomly selected templates and some number of randomly selected unrelated templates. In contrast with BM25 and the pretrained SBERT model, DPR is directly trained on the training data and reaches better results.

Two versions of a new training method were executed upon the two datasets—one with a DPR training method and improved sampling as described above (but with a traditional loss function), and one with a DPR training method plus improved sampling and the new loss function described above.

For each data set and each training method, ranking metrics including MRR@10 (Mean Reciprocal Rank for 10 results) and Recall@3 (for the top 3 results) are shown in FIG. 7B, along with the number of epochs required to train a model according to the method. The listed results comprise the median value and variance obtained from 4 runs of each method, with a different seed for each run. FIG. 7B thus reveals that not only do the new training protocols provide better results (with statistically significant improvement), but they also achieve the improved accuracy with far less training, thereby requiring less time and consuming fewer computing resources to generate an effective and efficient model.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method, comprising:
    storing queries and templates;
    selecting a subset of the stored queries based on one or more of:
        a percentage of all stored queries; or
        a time period in which each stored query was received;
    iteratively performing the following steps until a performance metric for a model for matching a future query to one of the stored templates exceeds a performance threshold:
        selecting a random subset of the stored templates;
        generating a distribution based on the subset of stored queries and the random subset of templates by identifying each query of the subset of stored queries associated with each template of the random subset of stored templates;
        selecting a subset of queries from the distribution;
        generating a batch of training data based on the selected subset of queries from the distribution, wherein the batch of training data comprises one or more positively labeled training instances and one or more negatively labeled training instances, and executing a multi-term loss function on the batch of training data to train the model for matching the future query to one of the stored templates, wherein the multi-term loss function comprises:
a first weighted loss term corresponding to a similarity between a query of the subset of queries from the distribution and a template of the random subset of stored templates;
a second weighted loss term corresponding to a similarity between a first query of the subset of queries from the distribution and a second query of the subset of queries from the distribution;
a third weighted loss term corresponding to a similarity between a template of the random subset of stored templates and a second template of the random subset of stored templates; and
a fourth weighted loss term corresponding to a similarity between a template of the random subset of stored templates and a query of the subset of queries from the distribution, and wherein the multi-term loss function is configured to reduce a number of training iterations until the performance metric for the model for matching the future query to one of the stored templates exceeds the performance threshold.

2. The method of claim 1, wherein executing the multi-term loss function comprises:
for each respective query in the random subset of queries in the batch of training data:
executing the multi-term loss function for each combination of the respective query and each template of the random subset of stored templates to yield a query/template value; and
aggregating the query/template value for the respective query in the first weighted loss term.

3. The method of claim 2, wherein executing the multi-term loss function further comprises:
for each respective query in the random subset of queries in the batch of training data:
executing the multi-term loss function for each combination of the respective query and another query in the random subset of queries to yield a query/query value; and
aggregating the query/query value for the respective query in the second weighted loss term.

4. The method of claim 2, wherein executing the multi-term loss function further comprises:
for each respective template in the random subset of stored templates:
executing the multi-term loss function for each combination of the respective template and another template in the random subset of stored templates to yield a template/template value; and
aggregating the template/template value for the respective template in the third weighted loss term.

5. The method of claim 2, wherein executing the multi-term loss function further comprises:
for each respective template in the random subset of stored templates:
executing the multi-term loss function for each combination of the respective template and a query in the random subset of queries to yield a template/query value; and
aggregating the template/query value for the respective template in the fourth weighted loss term.

6. The method of claim 2, further comprising:
determining a first weight value for the first weighted loss term;
determining a second weight value for the second weighted loss term;
determining a third weight value for the third weighted loss term; and
determining a fourth weight value for the fourth weighted loss term.

7. The method of claim 1, further comprising:
receiving a new query, different from the stored queries; and
determining a predicted template from the stored templates for the new query by applying the model to the new query.

8. The method of claim 7, further comprising initiating a response to the new query using the predicted template.

9. A non-transitory computer-readable medium storing instructions that, when executed by a processor, cause the processor to perform a method comprising:
storing queries and templates;
selecting a subset of the stored queries based on one or more of:
a percentage of all stored queries; or
a time period in which each stored query was received;
iteratively performing the following steps until a performance metric for a model for matching a future query to one of the stored templates exceeds a performance threshold;
selecting a random subset of the stored templates;
generating a distribution based on the subset of stored queries and the random subset of templates by identifying each query of the subset of stored queries associated with each template of the random subset of stored templates;
selecting a subset of queries from the distribution;
generating a batch of training data based on the selected subset of queries from the distribution, wherein the batch of training data comprises one or more positively labeled training instances and one or more negatively labeled training instances; and
executing a multi-term loss function on the batch of training data to train the model for matching the future query to one of the stored templates,
wherein the multi-term loss function comprises:
a first weighted loss term corresponding to a similarity between a query of the subset of queries from the distribution and a template of the random subset of stored templates;
a second weighted loss term corresponding to a similarity between a first query of the subset of queries from the distribution and a second query of the subset of queries from the distribution;
a third weighted loss term corresponding to a similarity between a template of the random subset of stored templates and a second template of the random subset of stored templates; and
a fourth weighted loss term corresponding to a similarity between a template of the random subset of stored templates and a query of the subset of queries from the distribution, and
wherein the multi-term loss function is configured to reduce a number of training iterations until the performance metric for the model for matching the future query to one of the stored templates exceeds the performance threshold.

10. The non-transitory computer-readable medium of claim 9, wherein executing the multi-term loss function comprises:
for each respective query in the random subset of queries in the batch of training data:
executing the multi-term loss function for each combination of the respective query and each template of the random subset of stored templates to yield a query/template value; and
aggregating the query/template value for the respective query in the first weighted loss term.

11. The non-transitory computer-readable medium of claim 10, wherein executing the multi-term loss function further comprises:
for each respective query in the random subset of queries in the batch of training data:
executing the multi-term loss function for each combination of the respective query and another query in the random subset of queries to yield a query/query value; and
aggregating the query/query value for the respective query in the second weighted loss term.

12. The non-transitory computer-readable medium of claim 10, wherein executing the multi-term loss function further comprises:
for each respective template in the random subset of stored templates:
executing the multi-term loss function for each combination of the respective template and another template in the random subset of stored templates to yield a template/template value; and
aggregating the template/template value for the respective template in the third weighted loss term.

13. The non-transitory computer-readable medium of claim 10, wherein executing the multi-term loss function further comprises:
for each respective template in the random subset of stored templates:
executing the multi-term loss function for each combination of the respective template and a query in the random subset of queries to yield a template/query value; and
aggregating the template/query value for the respective template in the fourth weighted loss term.

14. The non-transitory computer-readable medium of claim 10, further comprising:
determining a first weight value for the first weighted loss term,
determining a second weight value for the second weighted loss term;
determining a third weight value for the third weighted loss term; and
determining a fourth weight value for the fourth weighted loss term.

15. The non-transitory computer-readable medium of claim 9, further comprising:
receiving a new query, different from the stored queries; and
determining a predicted template from the stored templates for the new query by applying the model to the new query.

16. The non-transitory computer-readable medium of claim 15, further comprising initiating a response to the new query using the predicted template.

17. A system, comprising:
a repository of stored queries;
a repository of stored templates;
one or more processors; and
memory storing instructions that, when executed by the one or more processors, cause the system to:
select a subset of the stored queries based on one or more of:
a percentage of all stored queries; or
a time period in which each stored query was received;
iteratively performing the following steps until a performance metric for a model for matching a future query to one of the stored templates exceeds a performance threshold:
select a random subset of the stored templates;
generate a distribution based on the subset of stored queries and the random subset of templates by identifying each query of the subset of stored queries associated with each template of the random subset of stored templates;
select a subset of queries from the distribution;
generate a batch of training data based on the selected subset of queries from the distribution, wherein the batch of training data comprises one or more positively labeled training instances and one or more negatively labeled training instances; and
execute a multi-term loss function on batch of training data to train a model for matching a future query to one of the stored templates,
wherein the multi-term loss function comprises:
a first weighted loss term corresponding to a similarity between a query of the subset of queries from the distribution and a template of the random subset of stored templates;
a second weighted loss term corresponding to a similarity between a first query of the subset of queries from the distribution and a second query of the subset of queries from the distribution;
a third weighted loss term corresponding to a similarity between a template of the random subset of stored templates and a second template of the random subset of stored templates; and
a fourth weighted loss term corresponding to a similarity between a template of the random subset of stored templates and a query of the subset of queries from the distribution, and
wherein the multi-term loss function is configured to reduce a number of training iterations until the performance metric for the model for matching the future query to one of the stored templates exceeds the performance threshold.

18. The system of claim 17, wherein in order to execute the multi-term loss function, the memory further stores instructions that, when executed by the one or more processors, cause the system to:
for each respective query in the random subset of queries in the batch of training data:
execute the multi-term loss function for each combination of the respective query and each template of the random subset of stored templates to yield a query/template value; and
aggregate the query/template value for the respective query in the first weighted loss term.

19. The system of claim 18, wherein in order to execute the multi-term loss function, the memory further stores instructions that, when executed by the one or more processors, cause the system to:

for each respective query in the random subset of queries in the batch of training data:
execute the multi-term loss function for each combination of the respective query and another query in the random subset of queries to yield a query/query value; and
aggregate the query/query value for the respective query in the second weighted loss term.

20. The system of claim 18, wherein in order to execute the multi-term loss function, the memory further stores instructions that, when executed by the one or more processors, cause the system to:

for each respective template in the random subset of stored templates:
execute the multi-term loss function for each combination of the respective template and another template in the random subset of stored templates to yield a template/template value; and
aggregate the template/template value for the respective template in the third weighted loss term.

21. The system of claim 18, wherein in order to execute the multi-term loss function, the one or more processors are further configured to cause the system to:

for each respective template in the random subset of stored templates:
execute the multi-term loss function for each combination of the respective template and a query in the random subset of queries to yield a template/query value; and
aggregate the template/query value for the respective template in the fourth weighted loss term.

22. The system of claim 18, wherein the memory further stores instructions that, when executed by the one or more processors, cause the system to:

determine a first weight value for the first weighted loss term;
determine a second weight value for the second weighted loss term;
determine a third weight value for the third weighted loss term; and
determine a fourth weight value for the fourth weighted loss term.

23. The system of claim 17, wherein the memory further stores instructions that, when executed by the one or more processors, cause the system to:

receive a new query, different from the stored queries; and
determine a predicted template from the stored templates for the new query by applying the model to the new query.

24. The system of claim 23, wherein the memory further stores instructions that, when executed by the one or more processors, cause the system to initiate a response to the new query using the predicted template.

25. The system of claim 17, wherein the memory further stores instructions that, when executed by the one or more processors, cause the system to:

test a performance of the model; and
when the performance of the model exceeds a threshold, replace a production model with the model.

* * * * *